Aug. 19, 1969 W. A. COCHRUM 3,461,470
THREAD-FORMING SCREW AND METHOD OF MAKING THE SAME
Filed July 7, 1966
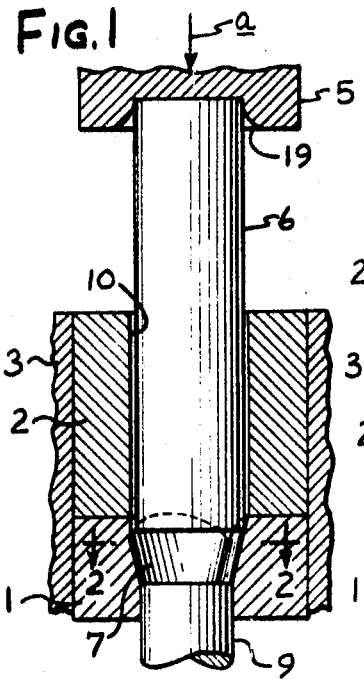
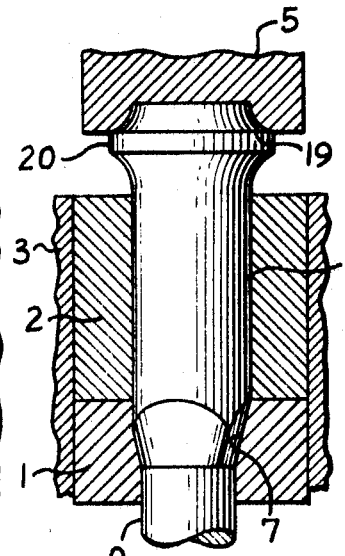
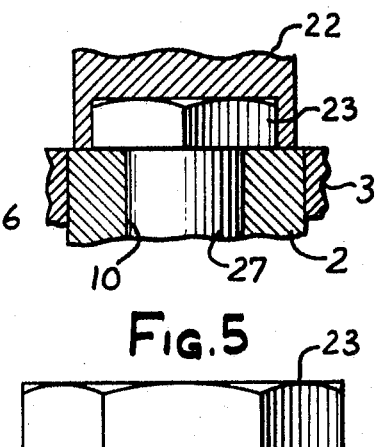
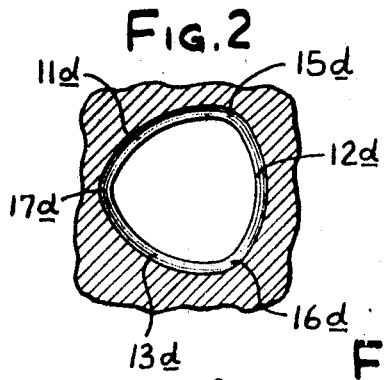
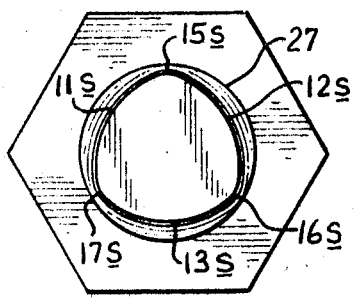
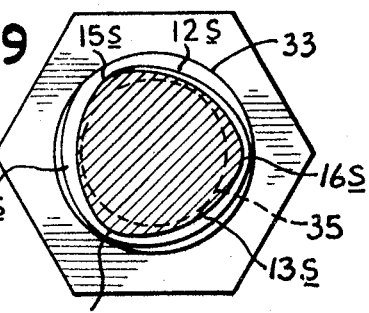
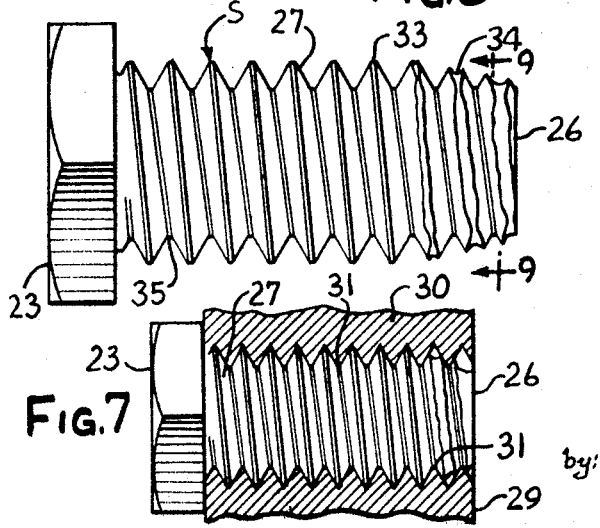
INVENTOR
WILLIAM A. COCHRUM
by Spector & Alster
ATTYS.

United States Patent Office 3,461,470
Patented Aug. 19, 1969

3,461,470
THREAD-FORMING SCREW AND METHOD OF MAKING THE SAME
William A. Cochrum, Roselle, Ill., assignor to The Fastron Company, Franklin Park, Ill., a corporation of Illinois
Filed July 7, 1966, Ser. No. 563,493
Int. Cl. B23g 9/00; B21h 3/02; F16b 33/02
U.S. Cl. 10—10                                                    2 Claims

ABSTRACT OF THE DISCLOSURE

A method of making a thread-forming screw comprises forcing a wire blank into a die cavity to form on the end of the blank a tapered lead section that has blending arcs, then while the blank is still in the die forming a head on the screw, and then separating the blank and die and thereafter roll-threading the blank to form a screw with a partially formed thread on the lead section and a fully formed thread on the adjacent holding section of the screw.

---

This invention relates to improvements in thread-forming screws and methods of making the same.

It is an object of the present invention to provide a thread-forming screw and method of making the same in which the screw has a short thread-forming lead section that is tapered toward the working end of the lead section and with the lead section having a partially formed roll thread with a series of lobes or high points surrounding the longitudinal axis of the screw and with the lobes being joined by convex arcuate portions in which the crest of the thread is of reduced diameter. The arcuate reduced portions form regions of relief relative to the pilot hole in the member being threaded so that the mating thread is formed essentially by the thread at the lobes. The lead section merges directly with a comparatively longer cylindrical holding section in which the helical thread is fully formed and has substantially constant crest and root diameters.

It is a further object of the present invention to provide a thread-forming screw and method of making the same in which the screw forms a stronger thread in the member being threaded as compared to cut threads because the thread in the member is formed by cold working rather than by "cutting."

It is another object of the present invention to provide a screw of the type stated which requires a relatively low driving torque to produce the mating thread in the member, yet is capable of sustaining a high clamping load without being stripped from the threaded member.

It is a further object of the present invention to provide a method of making a screw of the type stated in which a cylindrical wire is forced into a die cavity to form an end of the wire into a tapered lead section having blending convex arcs, whereupon the other end of the wire is die-shaped to form the head of the screw blank. The blank thus formed is then placed between parallel roll-threading dies, and by the application of uniform pressure along the dies, the cylindrical holding section and tapered lead section are threaded to provide a full thread in the holding section and a partial thread in the lead section.

The attainment of the above and further objects of the present invention will be apparent from the following description taken in conjunction with the accompanying drawing forming a part thereof.

In the drawing:

FIG. 1 is a fragmentary sectional view showing a step in the formation of a screw blank in accordance with the method of the present invention;

FIG. 2 is a fragmentary sectional view taken along line 2—2 of FIG. 1;

FIG. 3 is a fragmentary sectional view, similar to FIG. 1, and showing a further step of the method in which the lead section of the screw blank is die-formed;

FIG. 4 is a fragmentary sectional view showing a portion of the structure of FIG. 3 and showing the head being formed on the screw blank;

FIG. 5 is an elevational view of the completed screw blank;

FIG. 6 is an end view of the blank of FIG. 5;

FIG. 7 is a fragmentary sectional view, somewhat diagrammatic in character, and showing the blank being roll-threaded between roll-threading dies;

FIG. 8 is a side elevational view of the completed screw; and

FIG. 9 is a fragmentary sectional view taken along line 9—9 of FIG. 8.

Referring in more detail to the drawing, 1 designates a die or pointing insert and 2 designates a front section coaxial therewith, the die 1 and front section 2 being rigidly held in axial alignment by an encircling shroud 3. The shroud 3 is suitably attached to and forms part of a conventional screw-heading machine. Also forming part of the screw-heading machine is a ram 5 that applies axial force to a length of cylindrical wire 6 to force one end of the wire 6 into the die cavity 7, causing the end of the wire to assume the shape of the die cavity 7. The lower end of the die cavity 7 is closed off by an axially slidable ejector rod which ejects the finished blank from the die cavity 7 and the front section 2.

Wire stock of the requisite diameter is fed from a supply reel and is cut by a knife to precise length to provide the wire piece 6, and then the wire piece 6 is placed in axial alignment with the bore 10 of the front section 2, the bore 10 being of larger diameter than the wire 6. The ram 5 then imposes axial pressure in the direction of the arrow $a$ to move the wire 6 through the bore 10 and forcibly into the die cavity 7, as shown in FIG. 3. The wire-stock feeding mechanism, cutting knife and wire piece transfer mechanism, are all conventional in screw headers and, therefore, not shown or described herein.

The die cavity 7 is tapered toward the ejector 9 and has joining arcuate convex surfaces 11d, 12d, 13d which blend into high points or lobes 15d, 16d, 17d which are themselves arcuate. The taper of the die cavity wall that forms the convex surfaces and lobes may be of the order of 7 degrees and is exaggerated in the drawing herein for purposes of clarity of illustration. The ram 5 has a recess 19 for receiving the end of the wire 6, the recess 19 curving outwardly to provide space so that the end of the wire fills the space and flares outwardly as at 20 (FIG. 3) at the completion of the die-shaping of the lead section. Also, during this die-shaping the cylindrical wire 10 will expand diametrally somewhat within the clearance space provided by the cylindrical bore 10.

After the pointing or die-shaping operation has been completed (FIG. 3), the ram 5 is axially retracted and, with the wire still in the die, a heading ram 22 is forced against the flared wire end 20 to shape that end of the blank into the desired configuration of the screw head 23, for instance to the hexagonal shape shown. The heading ram 22 is then retracted, whereupon the ejector 9 is shifted axially through the die cavity 7 and bore 10 to eject the finished blank 25, shown in FIGS. 5 and 6, from the die sections 1, 2. Because of the blending arcs 11d, 12d, 13d and radii at the lobes 15d, 16d, 17d, sharp corners in the die cavity are minimized and the metal of the wire flows into conformity with the die cavity 7 to form the screw blank 25 with a tapered lead section 26 having arcuate convex surfaces 11s, 12s, 13s and lobes 15s, 16s, 17s that are companion-shaped to the corresponding surfaces in the die cavity 7. The part of the blank that was in the bore 10 during the forming and heading operations is a cylindrical section 27 which is preferably longer than the tapered lead section 26.

The blank 25 is then placed between conventional flat parallel roll-threading dies 29, 30 by moving one die parallel to the other at right angles to the plane of FIG. 7, the lead section 26 and cylindrical section 27 are roll-threaded to provide a screw S with thread of the type shown in FIGS. 8 and 9. These dies 29, 30 apply uniform pressure along the entire length of the blank 25 during the roll threading operation. The crest 31 on the thread of each roll threading die 29, 30 penetrates the blank 25 sufficiently to form a helical thread 33 along the cylindrical holding section 27 that is a fully formed thread in which the crest and root diameters are each constant and appear circular in cross section.

The lead section 26, which merges directly with the cylindrical holding section 27, has several turns, for example, two to four turns 34 of the thread, at least some turns of which, and usually all of which, are partially or incompletely formed. This is due to the fact that the crests 31 of the threads of the dies 29, 30 do not fully penetrate the metal of the lead section 26 but penetrate progressively less of the lead section from the junction with the holding section 27 to the smaller sized end of the screw. The root diameter 35 of the thread 33 will be the same as that of the partial thread 34 because the longitudinal axis of the blank remains the same distance from each die 29, 30 during the threading operation.

Accordingly, on the lead section 26, the partially formed thread 34 is peaked or is of maximum crest on the lobes 15s, 16s, 17s and is reduced, or of lesser crest, on the arcuate sections 11s, 12s, 13s. Furthermore, the thread progressively becomes more completely formed for each turn from the smaller end toward the junction of the holding section 27, with the result that at each turn the peaks or lobes are more completely formed (and hence of greater crest diameter) than are the peaks of the preceding turn of the thread. The peaks of the turn adjacent to the holding section have the most complete formation, in some instances with the last one or two lobes being substantially completely formed, depending upon the pitch of the thread and the precise place it begins on the lead section.

It will be apparent that the arcuate sections between the lobes also have a partially formed thread which will be less formed for each turn in each section than is the thread of the lobes that is joined by the arcuate section. Depending also where the thread begins, it is possible that in part of the first turn there is no thread on an arcuate section.

The screw S has a thread-forming lead section 26 and a cylindrical threaded holding section 27. When the screw S is threaded into a pilot hole of a member in which a mating thread is to be formed, the thread on the lobes cold works the member and forms the thread therein. The arcuate sections provide regions of relief that reduce the driving torque required to form the thread. The thread 33 on the holding section makes full thread-contact around 360 degrees with the mating thread in the member and thus provides a maximum of holding between the screw and member.

In compliance with the requirements of the Patent Statutes, I have herein shown and described a preferred embodiment of the invention. It is, however, to be understood that the invention is not limited to the precise construction and method herein shown, the same being merely illustrative of the principles of the invention.

What is considered new and sought to be secured by Letters Patent is:

1. A method of making a thread-forming screw, said method comprising forming a screw blank by
    forcing one end of a discrete length of cylindrical wire constituting a blank axially into a tapered die to cause the material of a minor length of the wire blank adjacent said one end to flow and take the shape of the die cavity and form on only a short length of the blank a tapered lead section having joining arcuate convex surfaces with the regions of juncture of said surfaces constituting circumferentially-spaced lobes that extend longitudinally of the section and with the lobes being farther from the longitudinal axis of the wire than the portions of the convex surfaces circumferentially therebetween,
    forcing the other end of said blank into a heading die to form a head on said other end,
    separating the thus formed blank from the dies, and
    threading the formed blank by rolling the blank between parallel roll-threading dies and applying uniform pressure to the last-mentioned dies along the length of said blank during the roll-threading to form on a cylindrical section of said blank and said lead section a thread that has a substantially constant crest diameter on the cylindrical section and a variable crest diameter on the lead section and being at least in part only partially formed on the lead section and with the thread on the lobes providing spaced threaded peak portions separated by arcuate convex regions of lesser diameter that provides regions of relief to reduce the torque required for forming a mating thread by the action of the threaded lobes.

2. A method according to claim 1 in which the said lead section has from 2 to 4 threads.

References Cited

UNITED STATES PATENTS

| | | | |
|---|---|---|---|
| 3,180,126 | 4/1965 | Carlson | 10—10 X |
| 3,195,156 | 7/1965 | Phipard | 10—10 |
| 3,218,656 | 11/1965 | Reiland | 10—10 |

LEONIDAS VLACHOS, Primary Examiner

U.S. Cl. X.R.

10—27; 85—47